(12) United States Patent
Bilski et al.

(10) Patent No.: US 9,884,278 B2
(45) Date of Patent: Feb. 6, 2018

(54) FLUID FLOW CONTROLLER AND FILTER ASSEMBLY WITH FLUID FLOW CONTROLLER

(71) Applicant: Fram Group IP LLC, Lake Forest, IL (US)

(72) Inventors: Gerard W. Bilski, Perrysburg, OH (US); Timothy L. Memmer, Bowling Green, OH (US)

(73) Assignee: Farm Group IP, LLC, Lake Forest, IL (US)

( * ) Notice: Subject to any disclaimer, the term of this patent is extended or adjusted under 35 U.S.C. 154(b) by 312 days.

(21) Appl. No.: 14/628,780

(22) Filed: Feb. 23, 2015

(65) Prior Publication Data

US 2015/0238885 A1  Aug. 27, 2015

Related U.S. Application Data

(60) Provisional application No. 61/945,653, filed on Feb. 27, 2014.

(51) Int. Cl.

| | |
|---|---|
| *F16K 15/02* | (2006.01) |
| *F16K 15/14* | (2006.01) |
| *B01D 35/157* | (2006.01) |
| *B01D 35/153* | (2006.01) |
| *F01M 11/03* | (2006.01) |
| *B01D 27/10* | (2006.01) |

(52) U.S. Cl.
CPC ....... *B01D 35/1573* (2013.01); *B01D 27/103* (2013.01); *B01D 27/106* (2013.01); *F01M 11/03* (2013.01); *F16K 15/025* (2013.01); *F16K 15/028* (2013.01); *Y10T 137/7929* (2015.04)

(58) Field of Classification Search
CPC ...................................................... F16K 15/025
USPC ........................................................ 137/857
See application file for complete search history.

(56) References Cited

U.S. PATENT DOCUMENTS

| | | | | |
|---|---|---|---|---|
| 3,235,085 A | * | 2/1966 | Humbert, Jr. ........ | B01D 27/103 137/115.16 |
| 3,618,775 A | * | 11/1971 | Hultgren .............. | B01D 27/103 210/130 |
| 3,861,570 A | * | 1/1975 | Green .................... | B65D 83/48 222/402.17 |
| 5,256,280 A | * | 10/1993 | Anderly ................ | B01D 27/06 210/130 |
| 7,175,761 B2 | | 2/2007 | Stanhope et al. | |

(Continued)

*Primary Examiner* — Krishnan S Menon
*Assistant Examiner* — Bradley R Spies
(74) *Attorney, Agent, or Firm* — Barnes & Thornburg LLP; Elizabeth A. Peters

(57) ABSTRACT

A filter assembly comprises a housing open at a first end and holding a filter element therein and an end plate secured to the housing and closing the first end and enclosing the filter element within the housing. The plate includes a first inlet opening, a second inlet opening, and an outlet opening. The filter assembly further includes a fluid flow controller disposed between an end of the filter element and the end plate. The flow controller includes a valve including a first portion cooperating with the first inlet opening and a second portion cooperating with the second inlet opening. The fluid flow controller further includes a spring-loaded valve seat in communication with the valve and providing resistance to movement of the first portion of the valve.

17 Claims, 6 Drawing Sheets

(56) References Cited

U.S. PATENT DOCUMENTS

2005/0103692 A1* 5/2005 Stanhope ............. B01D 27/005
              210/130
2013/0119289 A1* 5/2013 Morris ...................... F16K 7/17
              251/331

* cited by examiner

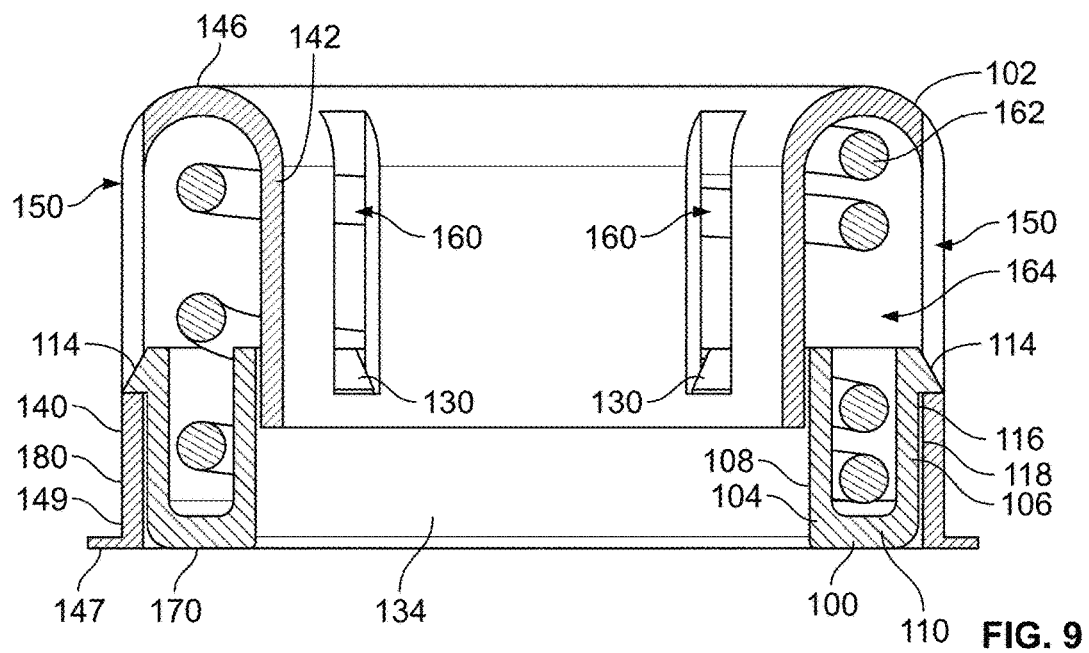
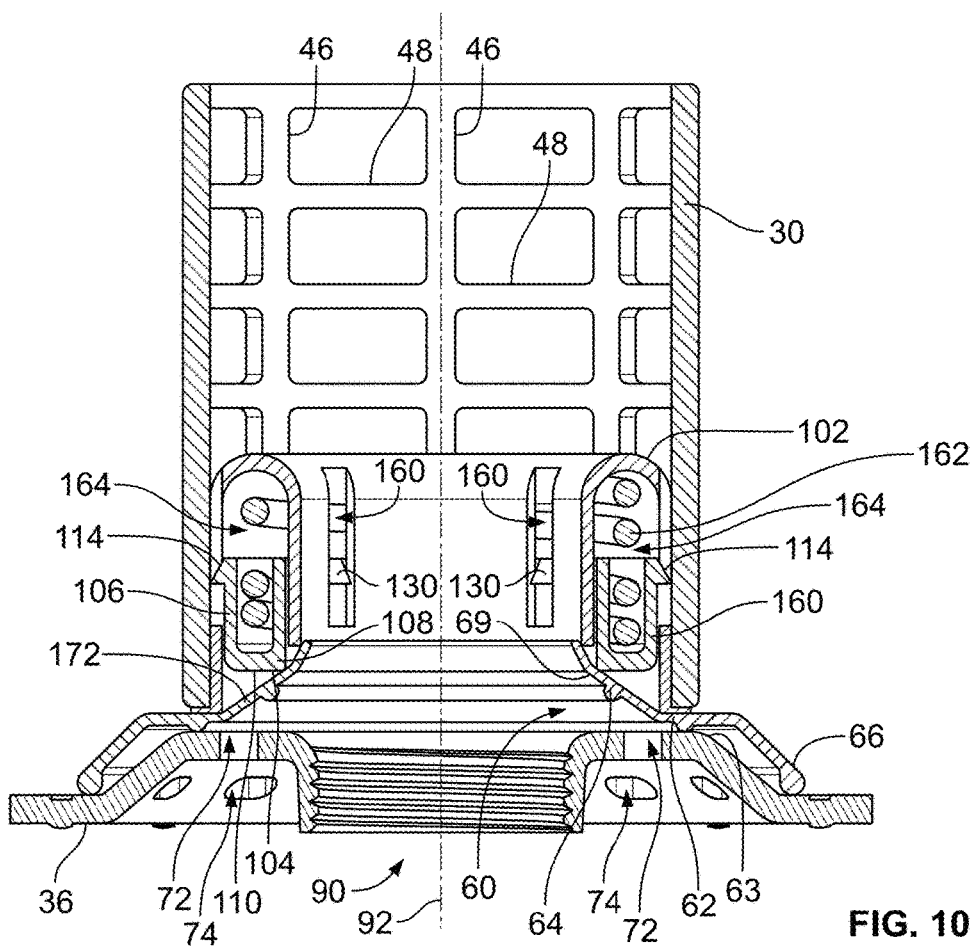

FLUID FLOW CONTROLLER AND FILTER ASSEMBLY WITH FLUID FLOW CONTROLLER

CROSS-REFERENCE

This application claims the benefit of U.S. Provisional Patent Application No. 61/945,653, filed on Feb. 27, 2014, and entitled "FLUID FLOW CONTROLLER AND FILTER ASSEMBLY WITH FLUID FLOW CONTROLLER", the entire disclosure of which is incorporated herein.

BACKGROUND

1. Field of the Disclosure

The present disclosure relates generally to a fluid filter assembly and, more particularly, to a fluid filter assembly having a fluid flow controller.

2. Background of the Disclosure

Filter assemblies generally include a housing having an open end, a filter element received in the housing, an end plate closing the open end and having inlet and outlet openings therein, and a valve for cooperating with the inlet openings to allow oil to flow into the filter through the inlet openings, but prevent flow of oil in a reverse direction. Prior art filters have included a combination valve having two portions, the first portion for closing the inlet openings to block the flow of oil back out of the inlet openings when the oil is not being circulated and the second portion for opening a bypass opening when the filter media is clogged for returning oil to the engine to keep the engine lubricated even though the filter element is clogged. Such a construction is disclosed in Stanhope et al. U.S. Pat. No. 7,175,761.

The present disclosure improves upon current valves and overcomes disadvantages and deficiencies of such prior art constructions.

SUMMARY

In an illustrative embodiment, a filter assembly may including a housing open at a first end and holding a filter element therein and an end plate secured to the housing and closing the first end, and enclosing the filter element within the housing, the end plate including a first inlet opening, a second inlet opening, and an outlet opening. The filter assembly may further include a fluid flow controller disposed between an end of the filter element and the end plate, the fluid flow controller comprising a valve including a first portion cooperating with the first inlet opening and a second portion cooperating with the second inlet opening. The fluid flow controller may further include a spring-loaded valve seat in communication with the valve and providing resistance to movement of the first portion of the valve.

In any of the embodiments herein, the fluid flow controller may be adapted to allow fluid flow through the first inlet opening when a first differential pressure across the first portion of the valve is reached and to allow fluid flow through the second inlet opening when a second differential pressure that is less than the first differential pressure across the first portion of the valve is reached.

In any of the embodiments herein, the valve seat may be positioned adjacent the first portion of the valve and may be movably positioned within a stationary valve housing. In any embodiments herein, an annular flange may extend outwardly from the valve housing and may be positioned between the filter element and the valve to retain the valve housing in position and prevent movement of the valve housing.

In any of the embodiments herein, the valve seat may include an outer wall with a plurality of projections that extend from the outer wall into a plurality of slots disposed within an outer wall of the valve housing. In any of the embodiments herein, the valve seat may include an inner wall with a second plurality of projections that extend from the inner wall into a second plurality of slots disposed within an inner wall of the valve housing. In any of the embodiments herein, the plurality of slots within the outer wall may be offset with respect to the second plurality of slots within the inner wall and the plurality of projections within the outer wall may be offset with respect to the second plurality of slots within the inner wall.

In any of the embodiments herein, the valve seat and the valve housing may include U-shaped bodies that form a continuous cavity in which a spring is disposed. In any of the embodiments herein, the spring may bias the valve seat against the first portion of the valve and, when a predetermined differential pressure across the first portion of the valve is reached, the valve seat is pushed against the bias of the spring into the valve housing to open the first inlet opening.

In any of the embodiments herein, at least one projection may extend from a surface of the first portion of the valve toward the end plate to provide spacing between the first portion of the valve and the end plate.

In another illustrative embodiment, a fluid flow controller for a filter assembly may include a check valve including a first portion and a second portion extending from and connected to the first portion and a spring-biased valve seat disposed adjacent the first portion of the check valve. The spring-loaded valve seat may prevent opening of the first portion of the check valve below a predetermined pressure and a pressure required to move the second portion of the check valve may be less than the predetermined pressure required to move the first portion of the check valve.

In any of the embodiments herein, the valve seat may be positioned adjacent the first portion of the valve and may be movably positioned within a stationary valve housing.

In any of the embodiments herein, the valve seat may include an outer wall with a plurality of projections that extend from the outer wall into a plurality of slots disposed within an outer wall of the valve housing. In any of the embodiments herein, the valve seat may include an inner wall with a second plurality of projections that extend from the inner wall into a second plurality of slots disposed within an inner wall of the valve housing. In any of the embodiments herein, the plurality of slots within the outer wall may be offset with respect to the second plurality of slots within the inner wall and the plurality of projections within the outer wall may be offset with respect to the second plurality of slots within the inner wall.

In any of the embodiments herein, the valve seat and the valve housing may include U-shaped bodies that form a continuous cavity in which a spring is disposed. In any of the embodiments herein, the spring may bias the valve seat against the first portion of the valve and, when a predetermined differential pressure across the first portion of the valve is reached, the valve seat may be pushed against the bias of the spring into the valve housing to open the first inlet opening.

In another illustrative embodiment, a method of controlling fluid flow into a filter assembly including a housing open at a first end and holding a filter element therein, an end plate secured to the housing and closing the first end, and enclosing the filter element within the housing, the end plate including a first inlet opening, a second inlet opening, and an outlet opening, and a fluid flow controller disposed between an end of the filter element and the end plate, the fluid flow controller comprising a valve including a first portion cooperating with the first inlet opening and a second portion cooperating with the second inlet opening, and a spring-loaded valve seat in communication with the valve and providing resistance to movement of the first portion of the valve may comprise the step of allowing fluid flow into the filter assembly through only the second inlet opening when a first differential pressure across the valve is reached. The method may further comprise the step of forcing the spring-loaded valve seat away from the first portion of the valve when a second differential pressure greater than the first differential pressure across the valve is reached, thereby allowing fluid flow through the first inlet opening.

In any of the embodiments herein, the method may further include the step of forcing the sprong-loaded valve seat into a valve housing against the bias of a spring.

In any of the embodiments herein, the method may further include the step of providing a plurality of projections extending from the spring-loaded valve seat that slidingly engage a plurality of slots within the valve housing to allow longitudinal movement of the spring-loaded valve seat within the valve housing.

BRIEF DESCRIPTION OF THE DRAWINGS

FIG. 9 is a cross-sectional view of the valve seat of FIGS. 1 and 3-5 disposed within the valve housing of FIGS. 1 and 6-8;

FIG. 10 is a cross-sectional view similar to the view of FIG. 1 after the valve seat has been pushed away from the check valve toward an upper portion of the valve housing against the bias of a spring.

Other aspects and advantages of the present disclosure will become apparent upon consideration of the following detailed description, wherein similar structures have like or similar reference numerals.

DETAILED DESCRIPTION

The present disclosure is directed to a filter assembly including a fluid flow controller. While the present disclosure may be embodied in many different forms, specific embodiments are discussed herein with the understanding that the present disclosure is to be considered only as an exemplification of the principles of the disclosure, and it is not intended to limit the disclosure to the embodiment illustrated.

Figure 1:
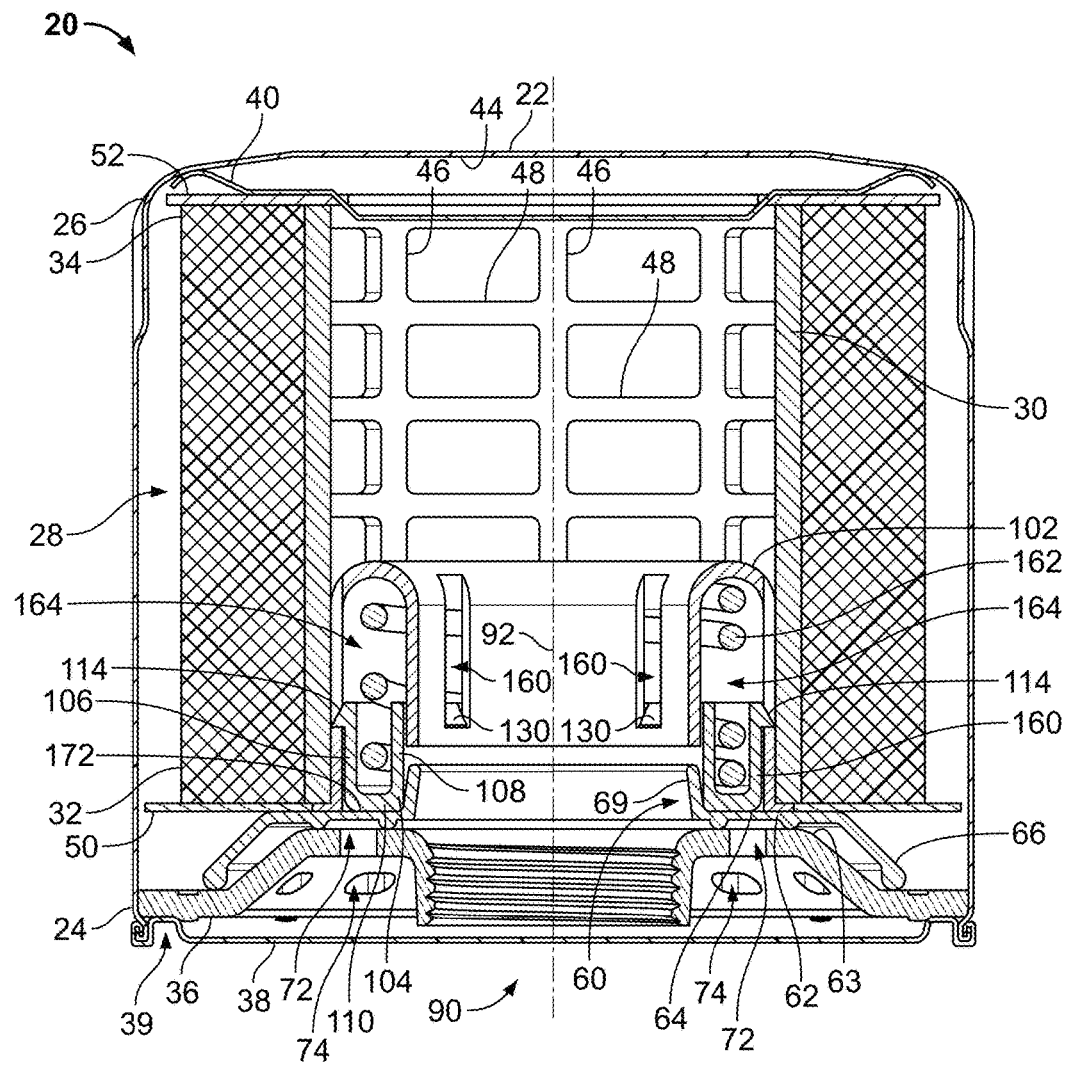
FIG. 1 is a cross-sectional view of a filter assembly including a cylindrical shell or housing holding a filter element and including a fluid flow controller for controlling flow of fluid into the housing, wherein the fluid flow controller generally includes a check valve, a valve seat, and a valve housing.

Referring to FIG. 1, a filter assembly 20 is depicted as having a generally cup-shaped cylindrical shell or housing 22 that is open at a first or lower open end 24 and closed at a second or upper, opposite end 26. A filter, for example, in the form of a filter element 28 mounted on a core 30, is disposed within the housing 22, wherein the filter element 28 includes a first or lower end 32 positioned adjacent the lower end 24 of the housing and a second or upper end 34 adjacent the second end 26 of the housing 22. While a particular filter is disclosed herein, one skilled in the art will understand that the principles of the present disclosure may be applied to any suitable filter assembly having any suitable filter. An end plate 36 is provided in the lower open end 24 of the housing 22 and may include a lid 38 attached thereto. An annular, resilient gasket (not shown) may be received and retained in a recess 39 in the lid 38 for providing a seal between the filter assembly 20 and an engine block (not shown) to which the filter assembly 20 is secured in normal use. Optionally, any other suitable additional or alternative seal may be used. A biasing element 40, for example, a spring, may be provided between the upper end 34 of the filter element 28 and an interior 44 of the housing 22 for biasing the filter element 28 toward the first end 24 of the housing 22. The biasing element 40 may be replaced with any suitable element(s) that bias the filter toward the first end 24 of the housing 22 or may be omitted.

The filter element 28 may include any suitable filter media comprised of, for example, pleated filter material composed of cellulose with some polyester. The core 30, which may be molded from any appropriate material, for example, a glass filled plastic, such as, Nylon, is perforated so as to permit fluid flow therethrough in use. The core 30 may comprise a cage formed by vertically disposed members 46 suitably secured to horizontally disposed members 48, as seen in FIG. 1. The filter media may be formed from a sheet of pleated material joined along the facing ends by a suitable adhesive to form an annular sleeve on the core 30. End caps 50, 52 may be disposed at the bottom and top, respectively, of the filter element 28. The end caps 50, 52 may be fabricated from a suitable composite material, for example, a cellulose/polyester composite. In an illustrative embodiment, the end caps 50, 52 are bonded to the filter media, for example, by ultrasonic welding, to form a seal between the ends of the filter media and the end caps 50, 52 to prevent fluid flow between these elements in use. The end caps 50, 52 may alternatively be bonded to the filter media in any other suitable manner.

The filter element 28 and housing 22 of the filter assembly 20 may be similar to the filter element 28 and housing 22 disclosed in Stanhope et al. U.S. Pat. No. 7,175,761, the disclosure of which is hereby incorporated by reference in its entirety. In other illustrative embodiments, the principles of the present disclosure may be applied to any suitable filter assembly having any suitable housing and/or any suitable filter element.

Figure 2:
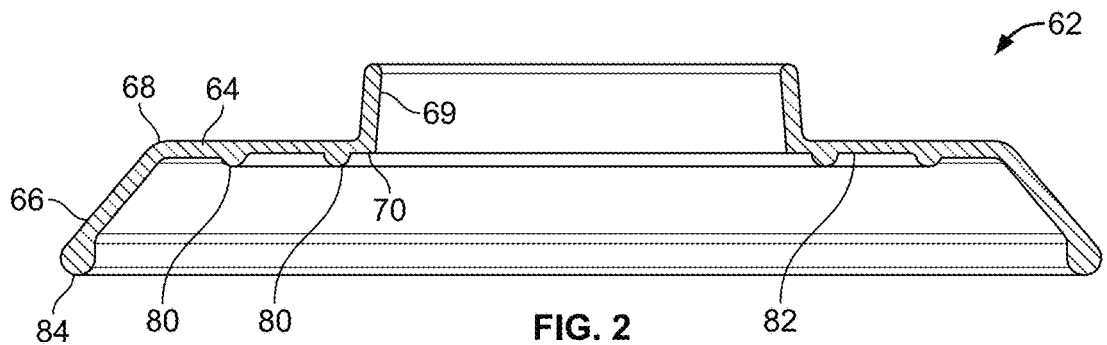
FIG. 2 is an enlarged cross-sectional view of the check valve of the fluid flow controller of FIG. 1.

Referring to FIG. 1, a fluid flow controller 60 is depicted within the filter assembly 20. The fluid flow controller 60 includes a check valve 62, as seen in FIGS. 1 and 2, retained between the lower end 32 (for example, the end cap 50) of the filter element 28 and a top or inner side 63 of the end plate 36. The check valve 62 may include a first portion 64 that is generally horizontal when positioned within the filter assembly 20, a second, angled portion 66 extending at an angle from a first end 68 of the first portion 64, and a third, generally vertical portion 69 extending at an angle of, for example, 90 degrees from a second end 70 of the first portion 64. The first portion 64 of the check valve 62 controls flow of fluid through a first inlet opening or openings 72 in the end plate 36 and the second portion 66 of the check valve 62 controls fluid flow through a second inlet opening or openings 74. The generally vertical portion 69 aligns the check valve 62 during manufacturing and keeps the check valve 62 aligned during use. Any suitable number of first inlet opening(s) 72 and/or second inlet opening(s) 74 may be provided.

As best seen in FIG. 2, one or more projections 80, such as rounded projections, may extend outwardly from a lower surface 82 of the first portion 64 of the check valve 62. The projections 80 may be full annular projections in order to create the appropriate seal against the end plate 36. Still further, the projections 80 may have any shape. A free end 84 of the second portion 66 may be bulbous. The projections 80 and the bulbous free end 84 elevate the first and second portions 64, 66 of the check valve 62 to provide a gap between elastomeric surfaces of the check valve 62 and the end plate 36 in order to distribute pressure evenly across surfaces of the check valve 62. The check valve 62 may be made of rubber, plastic, an elastomeric material, or any other suitable material.

An outlet opening 90 is provided centrally within the end plate 36. As seen in FIG. 1, the outlet opening 90 may be centrally disposed about a longitudinal axis 92 of the filter assembly 20. While the outlet opening 90 is depicted as being circular in cross-section, the outlet opening 90 may have any other suitable configuration depending on the application for the filter assembly 20. Still optionally, the outlet opening 90 may be oriented in any suitable manner.

Figure 3:
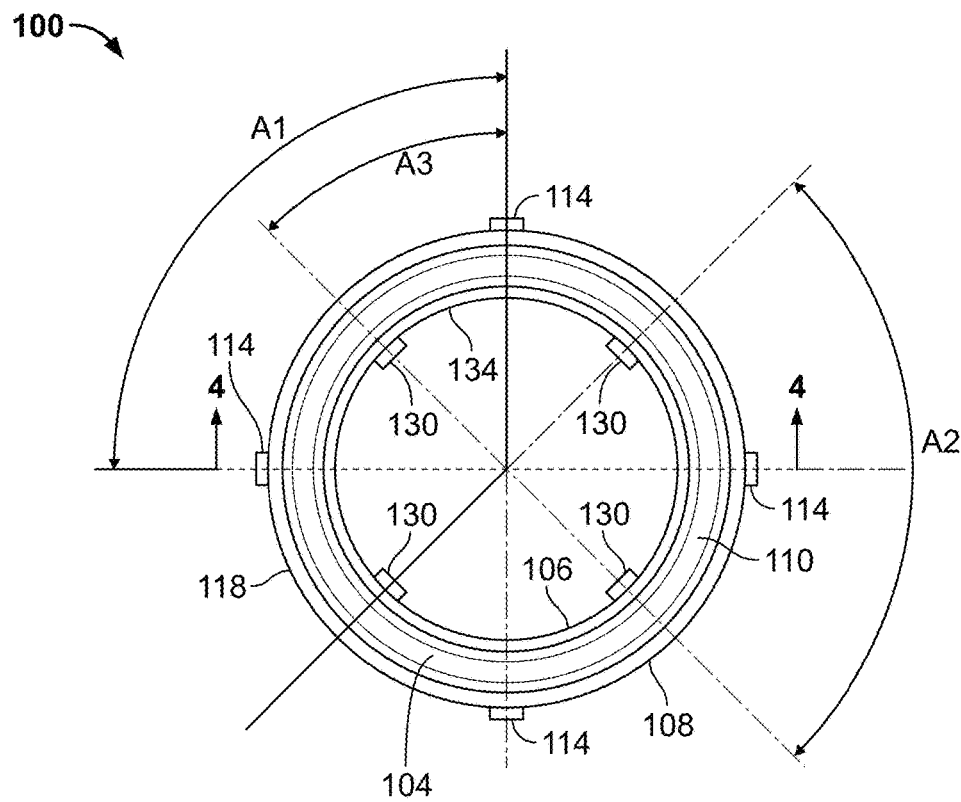
FIG. 3 is a top elevational view of the valve seat of the fluid flow controller of FIG. 1.
Figure 4:
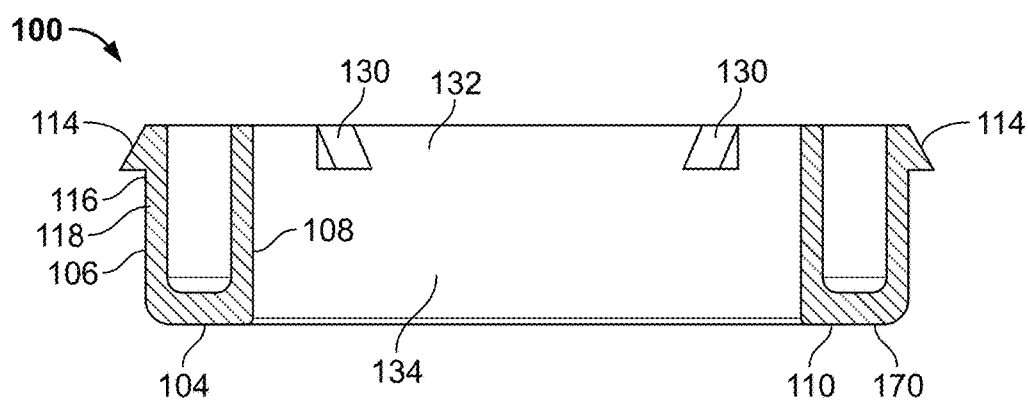
FIG. 4 is a cross-sectional view taken generally along the lines 4-4 of FIG. 3.
Figure 5:
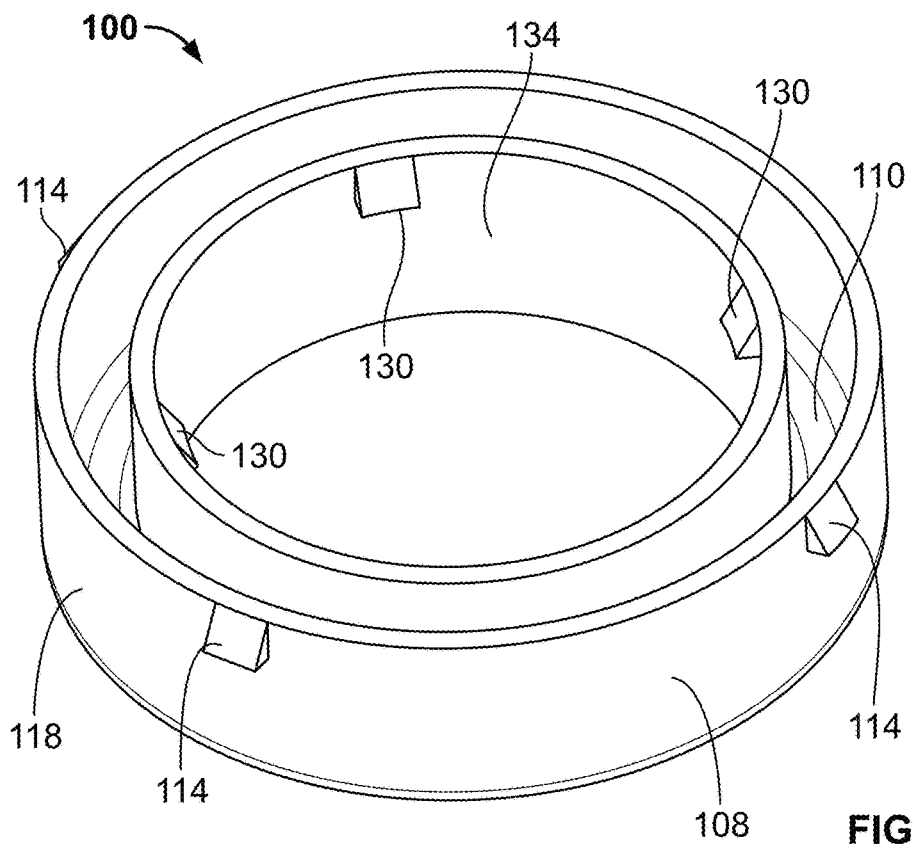
FIG. 5 is a top isometric view of the valve seat of FIGS. 1, 3, and 4.
Figure 6:
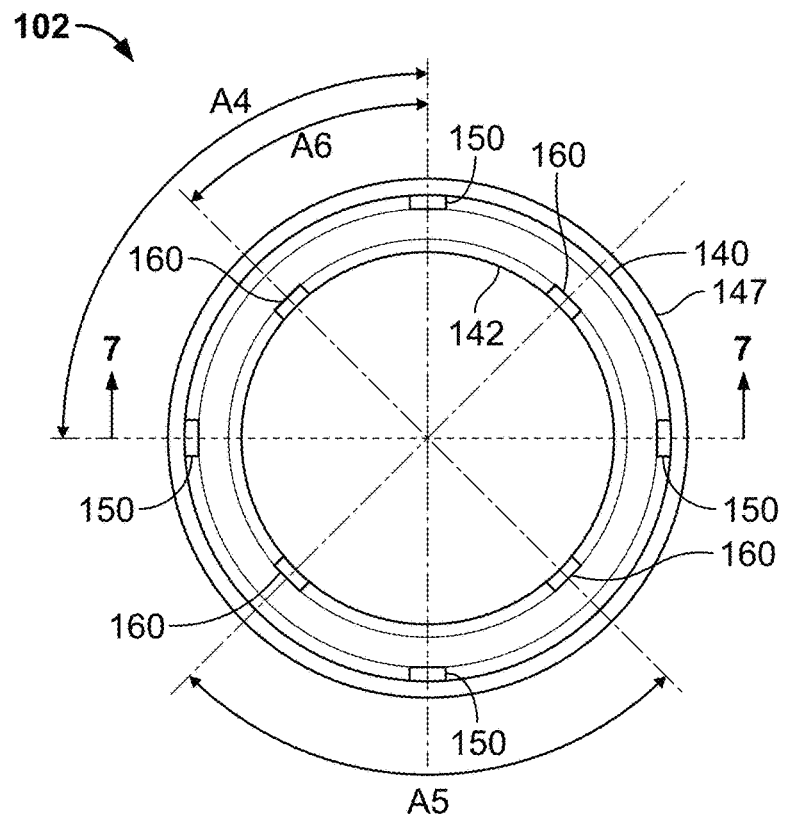
FIG. 6 is a top elevational view of the valve housing of the fluid flow controller of FIG. 1.
Figure 7:
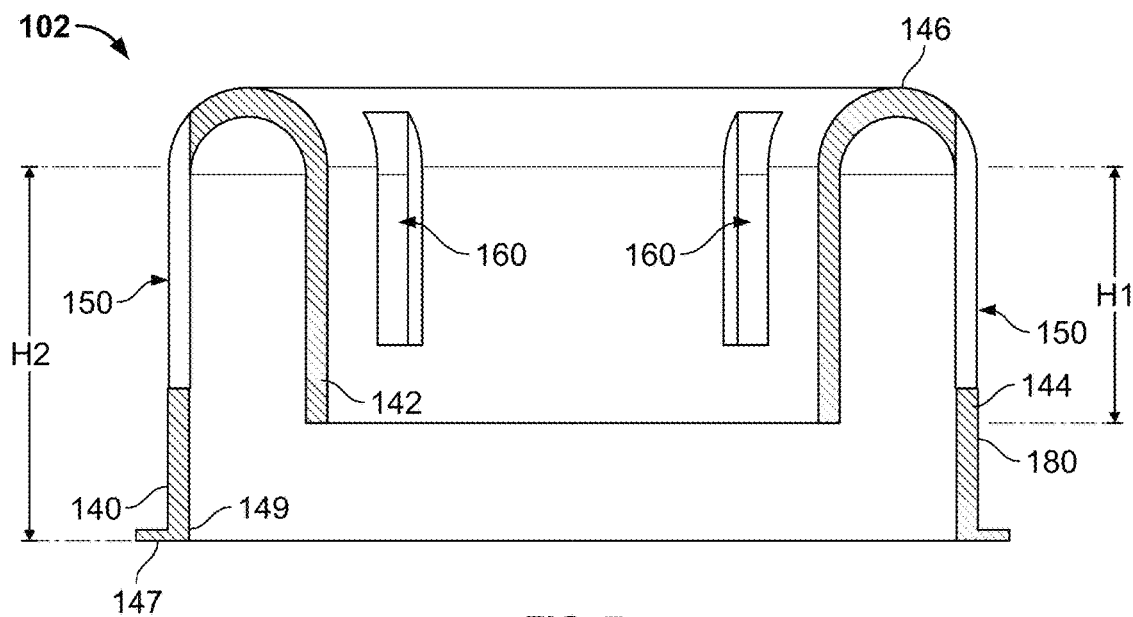
FIG. 7 is a cross-sectional view taken generally along the lines 7-7 of FIG. 6.
Figure 8:
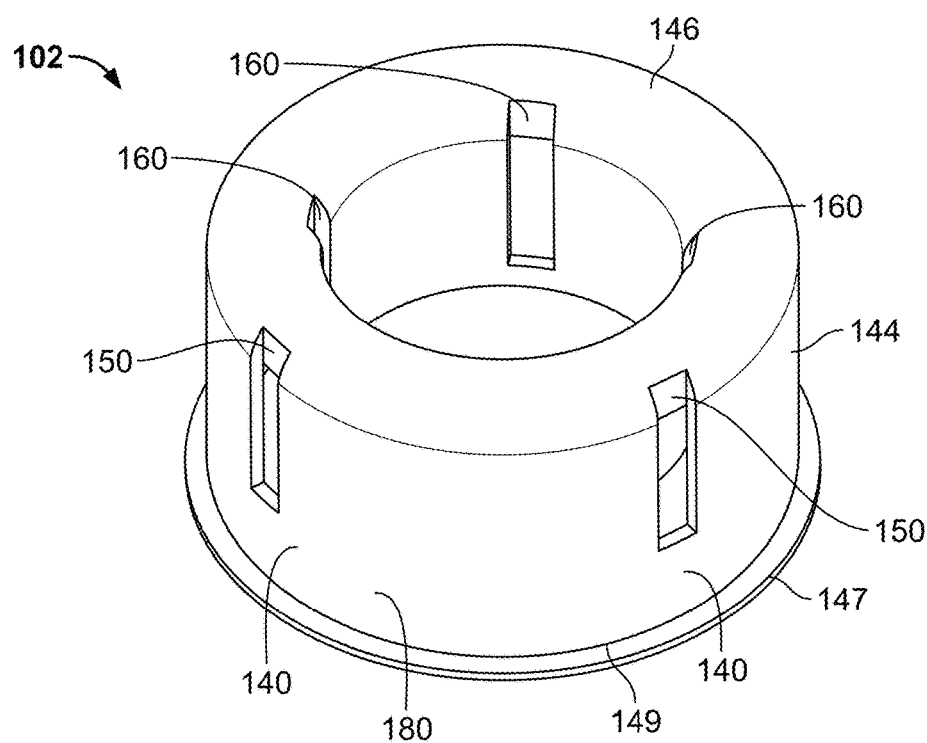
FIG. 8 is a top isometric view of the valve housing of FIGS. 1, 6, and 7.

Referring to FIGS. 1 and 9, a valve seat 100 is disposed within a valve housing 102 to allow longitudinal movement of the valve seat 100 within the valve housing 102, as will be discussed in greater hereinafter. As best seen in FIGS. 3-5, the valve seat 100 includes an annular U-shaped body 104 having an inner annular wall 106 and an outer annular wall 108 connected by a wall 110 that extends generally perpendicular to the inner and outer annular walls 106, 108. A first plurality of projections 114 extend outwardly from an upper edge 116 of an outer surface 118 of the outer annular wall 108. In an illustrative embodiment, four projections 114 may be utilized in which each of the projections 114 is spaced at an angle A1 of, for example, 90 degrees from each adjacent projection 114. In other illustrative embodiments, any suitable number of projections 114 may be utilized and/or the projections 114 may be spaced at any angle from adjacent projections 114. In further illustrative embodiments, the spacing between adjacent projections 114 need not be the same.

A second plurality of projections 130 extend inwardly from an upper edge 132 of an inner surface 134 of the inner annular wall 106. In an illustrative embodiment, four projections 130 may be utilized in which each of the projections 130 is spaced at an angle A2 of, for example, 90 degrees from each adjacent project 130. In other illustrative embodiments, any suitable number of projections 130 may be utilized and/or the projections 130 may be spaced at any angle from adjacent projections 130. In further illustrative embodiments, the spacing between adjacent projections 130 need not be the same.

Still referring to FIGS. 1, 3-5, and 9, the projections 114 may be offset from the projections 130, for example, the projections 114 may be spaced at an angle A3 of, for example, 45 degrees from each adjacent projection 130. As would be understood by one skilled in the art, the projections 114 may be aligned with the projections 130 or may be offset at any suitable angle.

As seen in FIGS. 1 and 6-9, the valve housing 102 includes a generally U-shaped body 140 having an inner annular wall 142 and an outer annular wall 144 connected by a rounded end wall 146. In illustrative embodiments, the inner annular wall 142 has a height H1 that is less than a height H2 of the outer annular wall 144, the function of which will be described in detail hereinafter. An annular flange 147 extends outwardly from a free end 149 of the outer annular wall 144. A first plurality of longitudinally extending slots 150 are disposed through the outer annular wall 144. In an illustrative embodiment, four slots 150 may be utilized in which each of the slots 150 is spaced at an angle A4 of, for example, 90 degrees from each adjacent slot 150. In other illustrative embodiments, any suitable number of slots 150 may be utilized and/or the slots 150 may be spaced at any angle from adjacent slots 150. In further illustrative embodiments, the spacing between adjacent slots 150 need not be the same. The number and spacing of the slots 150, in an illustrative embodiment, is the same as the number and spacing of the projections 114 extending from the outer surface 118 of the outer annular wall 108, such that the projections 114 fit within the slots 150, as will be discussed in more detail below.

A second plurality of longitudinally extending slots 160 are disposed through the inner annular wall 142. In an illustrative embodiment, four slots 160 may be utilized in which each of the slots 160 is spaced at an angle A5 of, for example, 90 degrees from each adjacent slot 160. In other illustrative embodiments, any suitable number of slots 160 may be utilized and/or the slots 160 may be spaced at any angle from adjacent slots 160. In further illustrative embodiments, the spacing between adjacent slots 160 need not be the same. The number and spacing of the slots 160, in an illustrative embodiment, is the same as the number and spacing of the projections 130 extending from the inner surface 134 of the inner annular wall 106, such that the projections 130 fit within the slots 160, as will be discussed in more detail below.

Still referring to FIGS. 1 and 6-9, the slots 150 may be offset from the slots 150, for example, the slots 150 may be spaced at an angle A6 of, for example, 45 degrees from each adjacent slot 160. As would be understood by one skilled in the art, the slots 150 may be aligned with the slots 160 or may be offset at any suitable angle. Regardless, in an illustrative embodiment, the slots 150, 160 may be arranged in the same manner as the projections 114, 130.

In use, each of the projections 114 of the valve seat 100 are aligned within one of the slots 150 in the valve housing 102. Similarly, each of the projections 130 of the valve seat 100 is disposed within one of the slots 160 in the valve housing 102. In this manner, the projections 114, 130 are positioned for longitudinal movement within the slots 150, 160, as will be discussed in greater detail below.

The check valve 62 may be made of Nitrile, Silicone rubber, or any other suitable material. The valve seat 100 and the valve housing 102 may be made of the same or different materials including, but not limited to, Nylon 6 with glass filling or Nylon 66 with glass filling. The materials for the check valve 62, the valve seat 100, and the valve housing 102 must be suitable for use with engine oil at up to 300 degrees Fahrenheit for several thousand miles.

As best seen in FIGS. 1, 9, and 10, a spring 162 is disposed within a cavity 164 formed between the U-shaped body 104 of the valve seat 100 and the U-shaped body 140 of the valve housing 102. In a non-operating condition or in an operating condition in which a predetermined pressure has not been met, the spring 162 biases the valve seat 100 to a position in which the projections 114, 130 are disposed at lowermost positions within respective slots 150, 160, as seen in FIG. 1. As will be discussed in more detail below, when a predetermined pressure is met, the valve seat 100 may be moved along the valve housing 102, whereby the projections 114, 130 ride along the slots 150, 160 to upper positions within respective slots 150, 160, as best seen in FIG. 10. While the projections 114, 130 are shown about half of the way up the slots 150, 160, the projections 114, 130 may be disposed at any point along the slots 150, 160, including uppermost edges of the slots 150, 160.

The assembly and operation of the filter assembly 20 and the fluid flow controller 60 will now be described. The filter element 28 is assembled with the annular filter media on the core 30 and the end caps 50, 52 secured in place. Assembly of the filter element 28 may occur prior to assembly of the filter assembly 20, for example, the filter element 28 may be purchased from a third party. The spring 40 or other biasing means, if used, is first inserted into the open end of the housing 12 until it seats against the closed end of the housing 22. The filter element 28 is positioned in the housing 22 abutting the spring 40.

As best seen in FIGS. 1, 9, and 10, the fluid flow controller 60 is assembled by positioning the annular flange 147 of the valve housing 102 positioned adjacent a lower end 32 of the filter assembly 20 or the end cap 50. The valve seat 100 is positioned within the valve housing 102 such that the valve housing 102 encloses the valve seat 100. More particularly, each of the projections 114 of the valve seat 100 is disposed within one of the slots 150 in the valve housing 102. Similarly, each of the projections 130 of the valve seat 100 is disposed within one of the slots 160 in the valve housing 102. Optionally, the valve seat 100 and the valve housing 102 may be assembled and, thereafter, positioned with the flange 147 adjacent a lower end 32 of the filter assembly 20 or the end cap 50. The longitudinal extent of the slots 150, 160 allows for movement of the projections 114, 130 along the slots 150, 160, respectively, to allow movement of the valve seat 100 within the valve housing 102, as will be discussed in greater detail below.

Still referring to FIGS. 1, 9, and 10, the check valve 62 is positioned adjacent the valve seat 100 and the valve housing 102. More specifically, an outer surface 170 of the wall 110 of the U-shaped body 104 of the valve seat 100 may be adjacent an outer surface 172 of the first portion 64 of the check valve 62. Further, the annular flange 147 of the valve housing 102 is sandwiched between the lower end 32 of the filter assembly 20 of the end cap 50 and the first portion 64 of the check valve 62. The end plate 36 is positioned adjacent the check valve 62 such that the first portion 64 of the check valve 62 covers the first inlet opening(s) 72 and the second portion 66 of the check valve 62 covers the second inlet opening(s) 74. The lid 38 may be disposed adjacent the end plate 36 for attachment to the housing 22.

Positioning of the end plate 36 in the housing 22 partially compresses the spring 40, whereby, when the parts are assembled, a spring force is applied to the top of the filter element 28 urging the filter element 28 toward the end plate 36. If the spring 40 is used, the spring force will help to clamp the fluid flow controller 60 between the filter element 28 and the end plate 36 and to seal flow between the filter element 28 and the end plate 36. The valve housing 102 is positioned in the core 30 with an outer surface 180 of the outer annular wall 144 disposed adjacent the core 30. As noted above, the annular flange 147 of the valve housing 102 is sandwiched between the lower end 32 of the filter assembly 20 of the end cap 50 and the first portion 64 of the check valve 62. Still further, the valve seat 100 is biased by the spring 162 against the check valve 62. These features form a liquid tight seal that prevents movement of fluid into the core 30 of the filter assembly 20 before a predetermined pressure flow is achieved.

Operation of the fluid flow controller 60, once the filter assembly 20 is assembled and secured to the engine block, will now be described in detail. The resistance of the first portion 64 of the check valve 62 is greater than a resistance of the second portion 66. More specifically, the elastomer of the second portion 66 insures that a pressure necessary to move the second portion 66 and open the second inlet opening(s) 74 is less than a pressure necessary to move the first portion 64 and open the first inlet opening(s) 72. In an illustrative embodiment, the second portion 66 of the check valve 62 may open the second inlet opening(s) 74 at a minimum opening pressure, for example, 1 pound per square inch (psi) and the first portion 64 of the check valve may open the first inlet opening(s) 72 at a predetermined higher pressure, for example, on the order of 8-10 psi.

The elastomeric material of the first portion 64 of the check valve 62 and/or the resistance of the properties of the spring 162 (e.g., the gauge, the material, the spring rate, the tensile strength, the hardness, the modulus of elasticity, the thickness, and/or any other spring properties) may be varied to vary the pressure necessary to move the first portion 64 of the check valve 62.

In operation, the filter assembly 20 is spun onto a stud on the engine block, which engages threads in the central outlet opening 90 in the end plate 36, and is secured in place. A gasket may engage the engine block and preclude fluid flow between the engine block and the filter assembly 20. While a particular gasket, end plate, and lid are described, any suitable gasket, end plate, and lid configurations may be utilized with the principles of the present application. When the engine is started, fluid, usually oil, will enter the filter assembly 20 through the second inlet opening(s) 74. Slight pressure will move the second portion 66 of the check valve 62 away from the second inlet opening(s) 74 and oil will flow through the second inlet opening(s) 74, the filter media of the filter element 28, and will be discharged through the central outlet opening 90 for return to the engine.

When the engine is turned off, the second portion 66 of the check valve 62 will close the second inlet opening(s) 74 and prevent return of oil in the filter assembly 20 to the engine. As the filter media clogs during normal operation, differential pressure will build across the first portion 64 of the check valve 62 and, upon attainment of a predetermined pressure, for example, on the order of between about 8 and about 10 psi in an illustrative embodiment, the first portion 64 of the check valve 62 will open, thereby pushing the valve seat 100 upwardly or inwardly into the valve housing 100. As discussed in detail above, the projections 114, 130 of the valve seat 100 ride along the slots 150, 160 of the valve housing 102 to upper positions within respective slots 150, 160, as best seen in FIG. 10. Movement of the valve seat 100 along the valve housing 102 allows the first portion 64 of the check valve 62 to open, as seen in FIG. 10, thereby permitting the flow of oil through the first inlet opening(s) 72 and back to the engine, thereby bypassing the filter media of the filter element 28. In other words, during periods of time when high differential pressure exists across the filter media, due to cold thick oil or high contaminant loading of the filter media, for example, the oil will travel through the first inlet opening(s) 72 and open the first portion 64 of the check valve 62 to permit oil to bypass the filter media and exit the filter assembly 20 through the central outlet opening 90 for return to the engine. The height difference (H2–H1) of the outer and inner walls 144, 142 of the valve housing 102 provides a gap for flow of oil directly into a central portion of the filter assembly 20, as depicted by the arrows in FIG. 10.

During operation, the spring 162 provides the desired amount of predetermined resistance to moving the first portion 64 of the check valve 62 and opening the first inlet opening(s) 72. More particularly, the spring 162 is designed with a particular resistance value (based on any number of spring properties, such as a gauge, spring rate, tensile strength, hardness, modulus of elasticity, thickness, and/or other spring properties), wherein the resistance value is overcome upon attainment of the predetermined pressure in the housing (for example, between about 8 and about 10 psi). The predetermined pressure, and thus the necessary resistance value of the first portion 64 of the check valve 62 may be different for different filter assemblies and/or applications. The spring 162 is easily customizable for these different applications and provides a more precise resistance value, thereby providing more control over the flow of fluid through the first inlet opening(s) 72.

In any of the embodiments herein, a resistance or load on the spring when assembled in the fluid flow controller may be determined by multiplying a surface area of the check valve that is exposed to a differential pressure across it times a predetermined relief valve opening pressure. For example, if an area under the spring is approximately 1 square inch and a predetermined valve opening pressure is 20 pounds per square inch (psi), the spring load would be 20 pounds.

While the valve seat 100 and the valve housing 102 are depicted and described as having particular shapes, the shapes thereof may vary without departing from the scope of the present application.

Figure 11:
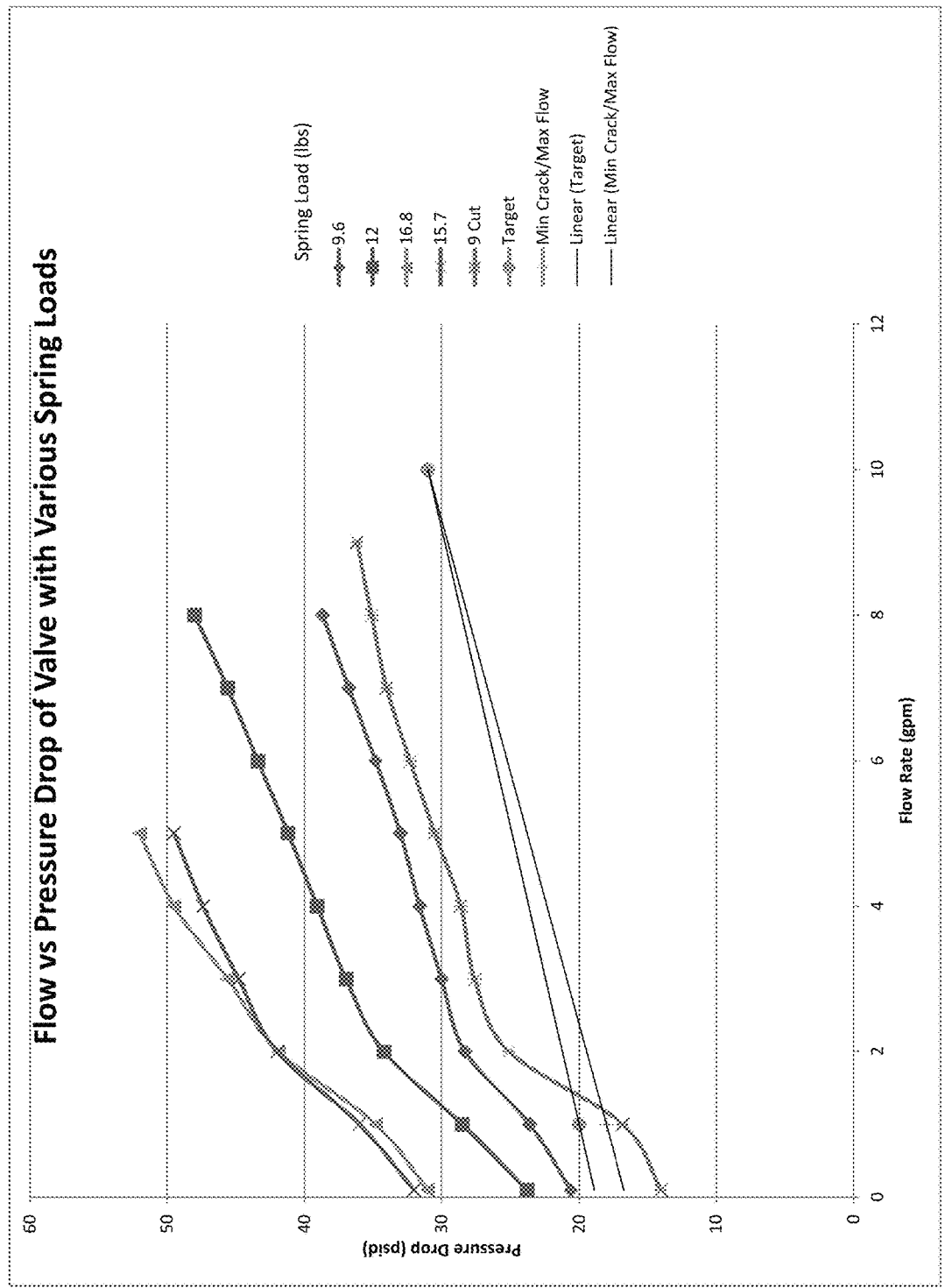
FIG. 11 is a graph depicting a flow rate versus a pressure drop across the check valve of FIGS. 1 and 2 for various spring loads.

FIG. 11 depicts a flow rate versus a pressure drop across the check valve 62 of FIGS. 1, 2, and 10 for various spring loads. As noted previously, different spring loads may be employed depending upon a desired flow rate and pressure drop.

While directional terminology, such as upper, lower, top, bottom, etc. is used throughout the present application, such terminology is not intended to limit the disclosure. Such terminology is only used for purposes of describing the various features and components in relation to one another.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

We claim:

1. A filter assembly comprising:
a housing formed to include an opening extending into the housing;
a filter element disposed within the housing;
an end plate secured to the housing and covering the opening to enclose the filter element within the housing, the end plate including a first inlet opening, a second inlet opening, and an outlet opening; and
a fluid flow controller disposed between an end of the filter element and the end plate, the fluid flow controller comprising:
a valve including a first portion positioned to cover the first inlet opening and a second portion positioned to cover the second inlet opening, the second portion extending from and connected to the first portion;
a movable valve seat engaged with the first portion of the valve;
a stationary valve housing; and
a spring engaged between the valve housing and the valve seat, the spring configured to bias the valve seat toward the first portion of the valve;
wherein the valve seat is movably positioned within the stationary valve housing, the valve seat includes an outer wall with a first plurality of projections that extend from the outer wall into a first plurality of slots formed through an outer wall of the valve housing and an inner wall with a second plurality of projections that extend from the inner wall into a second plurality of slots formed through an inner wall of the valve housing, and the spring is trapped between the valve housing and the valve seat.

2. The filter assembly of claim 1, wherein the fluid flow controller is adapted to allow fluid flow through the first inlet opening when a first differential pressure across the first portion of the valve is reached and to allow fluid flow through the second inlet opening when a second differential pressure that is less than the first differential pressure across the first portion of the valve is reached.

3. The filter assembly of claim 1, wherein an annular flange extends outwardly from the valve housing and is positioned between the filter element and the valve to retain the valve housing in position and prevent movement of the valve housing relative to the filter element.

4. The filter assembly of claim 1, wherein the valve seat and the valve housing include U-shaped bodies that that form a continuous cavity, and wherein the spring is disposed within the cavity.

5. The filter assembly of claim 4, wherein the spring is configured to bias the valve seat against the first portion of the valve to close the first opening when a differential pressure across the first portion of the valve is below a predetermined value.

6. The filter assembly of claim 1, wherein the first plurality of slots are offset with respect to the second plurality of slots, and wherein the first plurality of projections are offset with respect to the second plurality of projections.

7. The filter assembly of claim 1, further comprising a first projection extending from a surface of the first portion of the valve toward the end plate and a second projection extending from the surface of the first portion of the valve toward the end plate, and wherein the first projection and the second projection are configured to engage with the end plate to seal around the first inlet opening.

8. A fluid flow controller for a filter assembly, the fluid flow controller comprising:

a check valve including a first portion and a second portion extending from and connected to the first portion; and a spring-loaded valve seat disposed adjacent the first portion of the check valve and movably positioned within a stationary valve housing, wherein the spring-loaded valve seat is configured to resist movement of the first portion of the check valve when a differential pressure across the first portion of the check valve is below a predetermined value, the second portion of the check valve is movable when a pressure differential across the second portion of the check valve is above a predetermined value that is less than the predetermined value required to move the first portion of the check valve, and the spring-loaded valve seat includes a plurality of projections that extend through a plurality of slots formed through the valve housing.

9. The filter assembly of claim 8, wherein an outer wall of the valve seat includes a plurality of projections that extend from the outer wall into a plurality of slots formed through an outer wall of the valve housing.

10. The filter assembly of claim 8, wherein the valve seat and the valve housing include U-shaped bodies that form a continuous cavity in which a spring is disposed.

11. The filter assembly of claim 10, wherein the spring biases the valve seat against the first portion of the check valve.

12. The filter assembly of claim 9, wherein an inner wall of the valve seat includes a plurality of projections that extend from the inner wall into a plurality of slots formed through an inner wall of the valve housing.

13. The filter assembly of claim 12, wherein the plurality of slots within the outer wall of the valve housing are offset with respect to the plurality of slots within the inner wall of the valve housing, and wherein the plurality of projections on the outer wall of the valve seat are offset with respect to the plurality of projections on the inner wall of the valve seat.

14. The filter assembly of claim 4, wherein the spring biases the valve seat away from the valve housing such that the first plurality of projections engage with a lowermost end of the first plurality of slots to retain the spring at a predetermined compression.

15. The filter assembly of claim 14, wherein the spring biases the valve seat away from the valve housing such that the second plurality of projections engage with the lowermost position within the second plurality of slots to retain the spring at the predetermined compression.

16. The filter assembly of claim 10, wherein the spring biases the valve seat away from the valve housing such that the plurality of projections engage with a lowermost end of the plurality of slots to retain the spring at a predetermined compression.

17. A filter assembly comprising:
a housing formed to include an opening extending into the housing;
a filter element disposed within the housing;
an end plate secured to the housing and covering the opening to enclose the filter element within the housing, the end plate including a first inlet opening, a second inlet opening, and an outlet opening; and
a fluid flow controller disposed between an end of the filter element and the end plate, the fluid flow controller comprising:
an annular check valve positioned to surround the outlet opening and configured to selectively block fluid flow between the outlet opening and the first and second inlet openings, the check valve including a first portion positioned to cover the first inlet opening and a second portion positioned to cover the second inlet opening, the second portion extending from and connected to the first portion, the first portion formed to define a first projection extending from a bottom surface of the first portion toward the end plate and a second projection extending from the bottom surface toward the end plate, the first projection and the second projection configured to engage with the end plate to seal around the first inlet opening;
a movable valve seat engaged with the first portion of the check valve, the valve seat including an inner annular wall, an outer annular wall spaced apart from the inner annular wall, and a bottom wall connecting the inner and outer walls;
a stationary valve housing engaged with the filter element, the valve housing including an inner annular wall, an outer annular wall spaced apart from the inner annular wall, and a top wall connecting the inner and outer walls; and
a spring engaged with the valve seat and configured to bias the valve seat away from the valve housing and toward the first portion of the valve;
wherein the valve seat is movably positioned within the stationary valve housing, a first plurality of projections extend from the outer wall of the valve seat into a first plurality of slots formed through the outer wall of the valve housing and a second plurality of projections extend from the inner wall of the valve seat into a second plurality of slots formed through the inner wall of the valve housing, the spring is trapped between the valve housing and the valve seat, the spring is configured to resist movement of the valve seat and the first portion of the check valve when a differential pressure across the first portion of the check valve is below a predetermined value, and the second portion of the check valve is movable when a pressure differential across the second portion of the check valve is above a predetermined value that is less than the predetermined value required to move the first portion of the check valve.

* * * * *